United States Patent [19]

Poth et al.

[11] Patent Number: 4,576,868

[45] Date of Patent: Mar. 18, 1986

[54] COATING COMPOSITION PROCESS FOR THE PREPARATION OF COATINGS AND COATED SUBSTRATE

[75] Inventors: Ulrich Poth, Munster; Hans-Dieter Hille, Bergisch-Gladbach, both of Fed. Rep. of Germany

[73] Assignee: BASF Farben & Fasern Aktiengesellschaft, Hamburg, Fed. Rep. of Germany

[21] Appl. No.: 651,274

[22] Filed: Sep. 14, 1984

[30] Foreign Application Priority Data

Sep. 14, 1983 [DE] Fed. Rep. of Germany ....... 3333072

[51] Int. Cl.$^4$ .................... C08K 3/04; C08L 67/00; B32B 27/00; B05D 1/36
[52] U.S. Cl. .................... 428/423.1; 427/388.3; 427/409; 523/512; 524/439; 524/441
[58] Field of Search .................. 428/423.1; 427/388.3, 427/409; 523/512; 524/439, 441

[56] References Cited

U.S. PATENT DOCUMENTS

| | | | |
|---|---|---|---|
| 3,639,147 | 2/1972 | Benefiel et al. | 427/409 X |
| 4,315,053 | 2/1982 | Poth et al. | 427/409 X |
| 4,358,510 | 11/1982 | Ito et al. | 427/409 X |
| 4,382,114 | 5/1983 | Hohlein et al. | 427/409 X |
| 4,391,858 | 7/1983 | Batzill | 427/409 X |
| 4,413,036 | 11/1983 | Drexler et al. | 427/409 X |
| 4,463,038 | 7/1984 | Takeuchi et al. | 427/409 X |
| 4,477,536 | 10/1984 | Wright et al. | 427/409 X |
| 4,489,135 | 12/1984 | Drexler et al. | 427/409 X |
| 4,533,703 | 8/1985 | Kordomenos et al. | 427/409 X |

*Primary Examiner*—James R. Hoffman
*Attorney, Agent, or Firm*—Kenyon & Kenyon

[57] ABSTRACT

The invention relates to a coating composition for the preparation of the base coat of a multilayer enamel consisting of at least one base and one transparent protective coat, the said coating composition containing binders based on organic resins, metallic pigments, organic solvents and, if appropriate, other pigments as well as customary additives and auxiliaries. The coating composition contains, as binders, (A) polyurethane elastomers and/or polyurea elastomers, (B) polyesters and (C) polycondensates partially etherified with monoalcohols and consisting of melamine, benzoguanamine and/or urea with formaldehyde. The invention further relates to a process for the preparation of coatings using the coating composition, and to a substrate coated with a multilayer enamel.

14 Claims, No Drawings

COATING COMPOSITION PROCESS FOR THE PREPARATION OF COATINGS AND COATED SUBSTRATE

The invention relates to a coating composition for the preparation of the base coat of a multilayer enamel consisting of at least one base and one transparent protective coat, the said coating composition containing binders based on organic resins, metallic pigments, organic solvents and, if appropriate, other pigments as well as customary additives and auxiliaries.

U.S. Pat. No. 3,639,147 describes a so-called two-layer metallic enamel of the abovementioned type. In this and other known metallic enamels, the coating composition used to prepare the base coat contains cellulose esters, especially cellulose acetobutyrate, in order to improve the metallic effect of the resulting enamel.

The addition of cellulose acetobutyrate has some associated disadvantages; thus, problems of incompatibility with other enamel constituents frequently arise, the resulting coatings have a limited resilience and a poor interlayer adhesion, and the coatings which have not yet been stoved are etched in the so-called wet-in-wet process by the coating composition applied for the preparation of the transparent protective coat.

The object of the present invention is to avoid these disadvantages of the state of the art and to produce a coating composition for the preparation of the base coat of multilayer metallic enamels, the use of which is associated with a good compatibility, a good adhesion and a low degree of re-etching, and which leads to coatings having a good metallic effect without the use of cellulose acetobutyrate.

This object is achieved according to the invention by a coating composition of the type mentioned at the outset, wherein the binders consist of the following components:

(A) 20 to 60% by weight of one or more polyurethane and/or urea elastomers prepared from ($a_1$) linear compounds with terminal hydroxyl and/or primary and/or secondary amino groups and ($a_2$) aliphatic and/or cycloaliphatic diisocyanates, the molar ratio of $a_1$ to $a_2$ being 0.8:1 to 1.5:1, (B) 10 to 50% by weight of one or more polyesters prepared from ($b_1$) aromatic and aliphatic and/or cycloaliphatic polycarboxylic acids, 40 to 70 mol % of the polycarboxylic acids being aromatic and 60 to 30 mol % of the polycarboxylic acids being aliphatic and/or cycloaliphatic, and 0 to 50 mol % of the total polycarboxylic acids being tricarboxylic acids, and ($b_2$) polyols, 20 to 60 mol % of the polyols having 2 or 3 carbon atoms and 40 to 80 mol % having 4 or more carbon atoms, at least 40 mol % of the diols used having aliphatic side-chains, 0 to 50 mol % of the polyols being triols and the ratio of the components $b_1$ and $b_2$ corresponding to the following formula $$K = \frac{n_1 - n_2(F - 2)}{n_2}$$

in which $n_1$ denotes the number of mol of polyols, $n_2$ denotes the number of mol of polycarboxylic acids, F denotes the average molar value of the functionality of the polycarboxylic acids and K has a value of 1.05 to 1.5, and (C) 5 to 25% by weight of polycondensates partially etherified with monoalcohols and consisting of melamine, benzoguanamine and/or urea with formaldehyde, the molar ratio of melamine to formaldehyde in the case of melamine/formaldehyde resins being 1:4.5 to 1:6 and the molar ratio of benzoguanamine or urea to formaldehyde in the case of benzoguanamine/formaldehyde or urea/formaldehyde resins being 1:2.5 to 1:4, and the sum of the components A, B and C being 100%.

Suitable starting compounds $a_1$ for the preparation of component (A) are linear compounds with terminal hydroxyl groups. Thus, glycols such as, for example, ethylene glycol, propylene glycol, diethylene glycol or dipropylene glycol can be used here. Linear polyether glycols or polyester glycols with terminal hydroxyl groups can also be used.

The higher-molecular polyhydroxy compounds should be free of aromatic urethane groups (for example prepolymers from dihydroxy compounds and sub-stoichiometric quantities of aromatic diisocyanates should not be used) so that the light fastness of the process products is still ensured. Although polyacetals and polyethers can be used in principle, they are less suitable on account of their susceptibility to oxidative degradation. It is preferred to use polyesters, in particular those from adipic acid and diols or mixtures of diols, for example ethylene glycol and propylene glycol, butane-1,4-diol, 2,2-dimethylpropane-1,3-diol, hexane-1,3-diol, hexane-1,6-diol or bishydroxymethylcyclohexane. Diols having more than four C atoms are preferred. Polyesters with a narrow molecular weight distribution, which can be obtained by the condensation of caprolactone and diols, are also very suitable. Quite outstanding resistance to hydrolysis, which is far superior to the usual properties of polyesters, can be achieved with hexanediol polycarbonates or mixed hexandiol/adipic acid polycarbonates.

In addition to the said higher-molecular dihydroxy compounds, small quantities (about 0.05 to 2 mol/kg of elastomer) of lower-molecular diols having molecular weights of about 62 to 400, for example ethylene glycol, butane-1,4-diol, butane-2,3-diol, 2,2-dimethylpropane-1,3-diol or N-stearyl-N',N'-bis-hydroxyethylurea, can also be used, if appropriate, in the formation of the prepolymer. Particular preference is given to diols having tertiary amino groups, for example N,N-bis-($\beta$-hydroxyethyl)methylamine, N,N-bis($\beta$hydroxyethyl)isopropylamine, N,N-bis($\beta$-hydroxypropyl)tert.-amylamine or bis(3-aminopropyl)piperazine, because they further improve the stability of the polyurethanes to loss of strength on exposure to light.

The starting compounds $a_1$ can also be linear diamines with primary and/or secondary amino groups. Examples of these are ethylenediamine, 1,2- or 1,3-propylenediamine, 1,6-hexanediamine, 2-methyl-1,6-hexanediamine, 1-methyl-2,4-diaminocyclohexane, 1-amino-3-ammoniomethyl-3,5,5,-trimethylcyclohexane, 1,3- or 1,4-bis-aminomethylcyclohexane, 4,4'-diaminodicyclohexylmethane or similar diamines known per se. Other suitable chain lengtheners are hydrazine, methylhydrazine or adipic acid dihydrazide, semicarbazidopropionic acid hydrazide and the like.

Component $a_1$ is reacted with aliphatic and/or cycloaliphatic diisocyanates to give polyurethane elastomers or urea elastomers. Examples of suitable diisocyanates are hexamethylene 1,6-diisocyanate, 2,2,4-trimethylhexane diisocyanate, 4,8-dioxa-6,6-dimethylundecane 1,11-diisocyanate, lysine $C_1$-$C_6$-ester diisocyanates, dicyclohexylmethane 4,4'-diisocyanate, 3,3'-dimethyldicyclohexylmethane 4,4'-diisocyanate (preferably in the form of mixtures enriched in the cis/cis or cis/trans stereoisomers), cyclohexane 1,4-diisocyanate and very particularly 1-isocyanato-3-isocyanatomethyl-3,5,5-trimethylcyclohexane since this last compound gives polyurethanes which have the least tendency to gel in solution and have the best solubility in soft solvent mixtures. The reaction can be carried out in the melt and/or in inert solvents, for example toluene or xylene. It is usually carried out at temperatures of between 60° and 150° C., preferably 80° to 120° C., it being possible for the reaction time to be between about 10 minutes and several hours.

Thus, possible components (A) are either pure polyurethane elastomers or pure polyurea elastomers, as well as mixtures of these elastomers or mixed polyurethane/polyurea elastomers containing urethane and urea groups in one molecule The polyesters used as component (B) are prepared from polycarboxylic acids and polyols. Examples of suitable polycarboxylic acids are phthalic acid, isophthalic acid, terephthalic acid, hexahydrophthalic acid, adipic acid, azelaic acid, sebacic acid or trimellitic acid. The glycols already mentioned as components $a_1$ can be used as polyols. In addition to these, glycerol, trimethylolethane, trimethylolpropane or similar compounds are used as triols.

Amino resins, which are polycondensates of melamine, benzoguanamine and/or urea with formaldehyde, are used as component (C). These are partially etherified with monoalcohols. Examples of possible monoalcohols here are methanol, ethanol, propanol or butanol.

The coating compositions according to the invention have a good compatibility of all constituents, a good resilience and a good adhesion of the resulting coatings, as well as a low degree of re-etching in the wet-in-wet process. In particular, even when one-component and two-component clear lacquers having a high solids content are used for the transparent protective coat, the coating compositions are very suitable for overlacquering. Furthermore, the resulting multilayer enamels have a good metallic effect, even if the coating compositions according to the invention with a high solids content are applied. It has been found, moreover, that the coating compositions lead to an improved resistance to stone chips.

As an additional component (D) for improving the metallic effect, the coating composition advantageously contains a copolymer which has been prepared from 85 to 95% by weight of ethylene and 15 to 5% by weight of vinyl acetate, in a proportion of 5 to 15% by weight, based on the sum of components (A) to (D).

The resin (A) is advantageously based on polyester diols and diamines in a molar ratio of 0.8:1.2 to 1.2:0.8 as component $a_1$.

The metallic effect can advantageously be further improved if the coating composition contains as component (E), in addition to components (A), (B), (C) and if appropriate (D), polymeric microparticles having a size or size distribution in the range from 0.01 to 2 μm, in a proportion of 5 to 15% by weight, based on the sum of components (A) to (E), the said microparticles having been prepared by emulsion polymerization of a mixture of unsaturated monomers, some of which preferably contain carboxyl or hydroxyl groups and some of which are free of carboxyl and hydroxyl groups, and a polyfunctional crosslinking agent, the emulsion polymerization having been carried out in the aqueous phase and the water having been removed during or after the polymerization.

Polymeric microparticles of this type and the preparation of so-called microgels are described, for example, in European Patent Application No. A2-0,029,637.

The microparticles are preferably used in place of the ethylene/vinyl acetate copolymer. However, it is also possible to use the copolymer and the microparticles in conjunction with one another in order to improve the metallic effect.

Examples of possible unsaturated monomers for the preparation of the microparticles are, on the one hand, acrylic acid, methacrylic acid, hydroxyethyl acrylate, hydroxypropyl acrylate, hydroxyethyl methacrylate or hydroxypropylmethacrylate, and, on the other hand, alkyl esters of acrylic acid and methacrylic acid preferably having 1 to 4 carbon atoms in the alkyl radical, as well as styrene and α-methylstyrene.

Suitable polyfunctional crosslinking agents are compounds with two ethylenically unsaturated double bonds, which lead to crosslinked microparticles insoluble in the coating composition. Examples of these are: ethylene glycol dimethacrylate, tetraethylene glycol dimethacrylate, methylene-bis-acrylamide, methylene-bis-methacrylamide, divinylbenzene, vinyl methacrylate, vinyl crotonate, vinyl acrylate, divinylacetylene, trivinylbenzene, glycerol trimethacrylate, pentaerythritol tetramethacrylate, triallyl cyanurate, divinylethane and similar compounds such as those described in European Patent Application No. A2-0,029,637.

The invention also relates to a process for the preparation of coatings, in which a coating composition containing metallic pigments for the formation of a base coat is applied to a substrate, this being followed, after a period of exposure to the air, by the application according to the wet-in-wet process, of a second coating composition forming a transparent protective coat. In the process according to the invention, the binders consist of the following components:

(A) 20 to 60% by weight of one or more polyurethane and/or urea elastomers prepared from ($a_1$) linear compounds with terminal hydroxyl and/or primary and/or secondary amino groups and ($a_2$) aliphatic and/or cycloaliphatic diisocyanates, the molar ratio of $a_1$ to $a_2$ being 0.8:1 to 1.5:1, (B) 10 to 50% by weight of one or more polyesters prepared from ($b_1$) aromatic and aliphatic and/or cycloaliphatic polycarboxylic acids, 40 to 70 mol % of the polycarboxylic acids being aromatic and 60 to 30 mol % of the polycarboxylic acids being aliphatic and/or cycloaliphatic, and 0 to 50 mol % of the total polycarboxylic acids being tricarboxylic acids, and ($b_2$) polyols, 20 to 60 mol % of the polyols having 2 or 3 carbon atoms and 40 to 80 mol % having 4 or more carbon atoms, at least 40 mol % of the diols used having aliphatic side-chains, 0 to 50 mol % of the polyols being triols and the ratio of the components $b_1$ and $b_2$ corresponding to the following formula $$K = \frac{n_1 - n_2(F-2)}{n_2}$$

in which $n_1$ denotes the number of mol of polyols, $n_2$ denotes the number of mol of polycarboxylic acids, F denotes the average molar value of the functionality of the polycarboxylic acids and K has a value of 1.05 to 1.5, and (C) 5 to 25% by weight of polycondensates partially etherified with monoalcohols and consisting of melamine, benzoguanamine and/or urea with formaldehyde, the molar ratio of melamine to formaldehyde in the case of melamine/formaldehyde resins being 1:4.5 to 1:6 and the molar ratio of benzoguanamine or urea to formaldehyde in the case of benzoguanamine/formaldehyde or urea/formaldehyde resins being 1:2.5 to 1:4, and the sum of the components A, B and C being 100%.

Advantageous embodiments of the process according to the invention can be found in the sub-claims. The invention also relates to a substrate coated with a multilayer enamel consisting of at least one base coat containing metallic pigments and at least one transparent protective coat. The base coat has been prepared using the coating composition according to the invention.

The invention is illustrated in greater detail below with the aid of practical examples.

EXAMPLE A 1

741 g of a polyester of adipic acid and neopentyl glycol, with an OH number of 113, and 26.5 g of diethylene glycol are weighed out into a four-necked flask equipped with a stirrer, a thermometer and a reflux condenser, and are heated to 100° C. A vacuum is then applied for half an hour in order to remove all moisture present. 1850 g of butyl acetate, 393 g of dicyclohexylmethane 4,4'-diisocyanate and 0.3 g of dibutyltin dilaurate are then added at 5-minute intervals and the temperature is kept at 100° C. for 1.5 hours. The NCO content is now determined. It is 1.36%.

A mixture of 1840 g of butyl acetate, 1230 g of n-butanol and 70 g of hexamethylenediamine is introduced into a dilution vessel. The precursor containing NCO groups is added over a period of 15–20 minutes, with stirring. This gives an almost colorless, viscous solution with a solids content of 20%.

EXAMPLE A 2

As in Example A 1, the water is removed in vacuo from 1300 g of a caprolactone polyester with an OH number of 112, together with 73 g of neopentylglycol. After the addition of 1850 g of butyl acetate, 688 g of 3-isocyanatomethyl-3,5,5-trimethylcyclohexyl isocyanate are initially introduced. After about 5 minutes, 0.3 g of dibutyltin dilaurate is added. After a reaction time of 2 hours at 100° C., the NCO content of the solution is 2.27%.

A mixture of 1490 g of butyl acetate, 1671 g of n-butanol and 88 g of 1,3-diaminopropane is introduced into a dilution vessel. The precursor containing NCO groups is introduced over a period of 15–20 minutes, with stirring. This gives an almost colorless, viscous solution with a solids content of 30%.

EXAMPLE A 3

As in Example A 1, the water is removed in vacuo from 1500 g of a polyester of hexane-1,6-diol, neopentyl glycol and adipic acid, with an OH number of 75. After the addition of 2200 g of butyl acetate, 393 g of dicyclohexylmethane 4,4'-diisocyanate are initially introduced and 0.3 g of dibutyltin dilaurate is added after about 5 minutes. After a reaction time of 2 hours at 100° C., the NCO content of the solution is 0.98%.

A mixture of 2280 g of butyl acetate, 1490 g of butanol and 98 g of 1-amino-3-aminomethylcyclohexane is introduced into a dilution vessel. The precursor containing NCO groups is introduced over a period of 15–20 minutes with stirring. This gives a pale yellowish, viscous solution with a solids content of 25%.

EXAMPLE B 1

111.3 g of propane-1,3-diol, 329.9 g of 2,2-dimethylpropane-1,3-diol, 163.5 g of 1,1,1-trimethylolpropane, 216.7 g of phthalic anhydride, 243.0 g of isophthalic acid, 245.0 g of adipic acid, 30.0 g of xylene and 2 g of dibutyltin oxide are weighed out into a 2 liter four-necked flask fitted with a stirrer, an electrical resistance heater, a thermometer and a packed column filled with Pall rings and equipped with an overhead thermometer, a distillation bridge, a condenser and a receiver. The reaction mixture is heated rapidly to 160° C., with stirring. From 160° C., the temperature is increased over a period of 5 hours to 220° C. in such a way that the column overhead temperature does not exceed 103° C. The temperature is kept at 220° C. and the esterification is continued until an acid number (according to DIN) of 15 is reached. The reaction mixture is then cooled to 140° C. and the polyester is partially dissolved in 800 g of a 1:1 mixture of xylene and ethylglycol acetate, with continued cooling. This results in a 60% solution of a polyester with a molecular weight of 930 and an OH number (DIN) of 160, based on the solid polyester.

EXAMPLE B 2

Using the apparatus described in Example B 1, 60.4 g of ethane-1,2-diol, 74.0 g of propane-1,2-diol, 227.9 g of 2,2-dimethylpropane-1,3-diol, 229.9 g of hexane-1,6-diol, 485.1 g of isophthalic acid, 40.0 g of a mixture of aromatics with a boiling range of 180° to 205° C. and 3.0 g of dibutyltin oxide are weighed out. The mixture is heated as in Example 1 and esterified up to an acid number of 20. It is then cooled to 160° C., 213.3 g of adipic acid and 93.5 g of trimellitic anhydride are added and the mixture is heated again to 200° C. The temperature is kept at 200° C. and esterification is continued up to an acid number of 25. The mixture is cooled and dissolved as in Example 1. This results in a 60% solution of a polyester with a molecular weight of 960 and an OH number of 115, based on the solid polyester.

EXAMPLE B 3

Using the apparatus and procedure described in Example B 1, the following are weighed out and esterified at a maximum of 220° C.: 113.4 g of ethane-1,2-diol, 142.6 g of 2,2-dimethylpropane-1,3-diol, 279.8 g of neopentylglycol hydroxypivalate, 91.9 g of 1,1,1-trimethylolpropane. 303.5 g of isophthalic acid, 208.5 g of hexahydrophthalic anhydride, 200.2 g of adipic acid, 30 g of xylene and 2 g of dibutyltin oxide.

Esterification is continued at 220° C. up to an acid number of 5. This results in a 60% solution of a polyester with a molecular weight of 1520 and an OH number of 100, based on the solid polyester.

EXAMPLE B 4

Using the apparatus and procedure described in Example B 1, the following are weighed out and esterified at a maximum of 220° C.: 102.2 g of propane-1,2-diol, 102.2 g of propane-1,3-diol, 372.8 g of 2,2-dimethylpropane-1,3-diol, 60.0 g of 1,1,1-trimethylolpropane, 331.6 g of phthalic anhydride, 172.0 g of trimellitic anhydride, 196.3 g of adipic acid and 40 g of a mixture of aromatics with a boiling range of 180°–205° C. Heating is carried out as in Example 1, particular attention being paid to the overhead temperature, and esterification is continued at 200° C. up to an acid number of 10. The mixture is cooled and partially dissolved as in Example 1. This results in a 60% solution of a polyester with a molecular weight of 780 and an OH number of 198, based on the solid polyester.

EXAMPLE C

Melamine Resin

The following are weighed out into a 2 liter four-necked flask fitted with an electrical resistance heater, a stirrer, a thermometer and a distillation apparatus for the recycling operation with a water separator: 560 g of isobutanol, 250 g of 37% aqueous formaldehyde solution, 30 g of toluene and 0.05 g of 85% phosphoric acid. The reaction mixture is heated to 40° C. and 95.3 g of melamine are added. The mixture is heated to 85° C. and the temperature slowly raised to 100° C. so that the reaction mixture distils rapidly, water being separated out. The temperature is kept at 100° C. until a compatibility of 1/5 with a petroleum ether of boiling range 135°–180° C. is reached. The reflux of the distillation unit is then closed and 300 g of solvent are distilled off, during which time the temperature rises to 115° C. The reaction mixture is then cooled to 80° C. and diluted with 65 g of isobutanol. This results in a solution of a melamine resin with a solids content (60 minutes, 100° C.) of 55% and a viscosity of 250 seconds (DIN 53 211).

EXAMPLE D

Copolymer Dispersion

The following are weighed out into a heatable mixer fitted with a high-speed stirrer: 200 g of xylene and 100 g of an ethylene/vinyl acetate copolymer with a vinyl acetate content of 12%; the mixture is heated to 100° C. and stirred until a homogeneous solution is obtained. The solution is then cooled to 80° C. and precipitated with 700 g of a mixture of xylene and butyl acetate, the temperature falling to 50° C. during this process. This results in a 10% dispersion of the copolymer.

EXAMPLE E 1

Preparation of a microgel concentrate 2510 g of demineralized water together with 34 g of sodium lauryl-sulfate solution (35%) are heated to 80° C. in a polymerization vessel fitted with a stirrer, a reflux condenser and two feed vessels.

A pre-emulsion consisting of 1267 g of demineralized water, 65 g of sodium lauryl-sulfate solution (35%), 490 g of butanediol diacrylate, 478 g of methyl methacrylate and 140 g of hydroxypropyl methacrylate is prepared, with stirring, in a separate stirrer vessel.

The initiator solution, consisting of 14 g of ammonium persulfate and 660 g of demineralized water, is introduced into a feed vessel. The pre-emulsion and the initiator solution are then metered in simultaneously so that the introduction of the pre-emulsion takes 2 hours and that of the initiator solution 3 hours. The temperature is kept at 80° C. by cooling. After the introduction has ended, the temperature is kept at 80° C. for a further 1 hour.

This gives a 20% dispersion of crosslinked particles which are not soluble in any organic solvent.

2000 g of this aqueous dispersion, together with 620 g of n-butanol, are shaken vigorously for 10 minutes in a separating funnel. After an interval of 30 minutes, 2 phases are obtained. The lower, aqueous phase is discarded.

The butanol phase containing the microgel is transferred to a distillation flask equipped with a water separator and a stirrer. 333 g of the polyester described in Example B 2 and 500 g of ethylglycol acetate are introduced. The remaining water is then distilled off azeotropically in vacuo at a maximum of 60° C. This gives a microgel concentrate with a solids content of 32%.

EXAMPLE E 2

2000 g of the aqueous dispersion described in Example E 1, together with 800 g of butyl acetate, are shaken vigorously for 15 minutes in a separating funnel. After an interval of 1.5 hours, 2 phases are obtained. The aqueous phase is discarded. The organic phase is transferred to a distillation flask equipped with a water separator and a stirrer. 400 g of a polyester of adipic acid and neopentylglycol, with an OH number of 123, are introduced. All water still present is then completely distilled off azeotropically in vacuo at a maximum of 60° C. This gives a microgel concentrate with a solids content of 60%. 1500 g of this concentrate are treated with 280 g of dicyclohexylmethane 4,4'-diisocyanate and 0.3 g of dibutyltin dilaurate, as in Example A 1. After a reaction time of 2 hours, the NCO content is 2.66%.

A mixture of 1090 g of butyl acetate, 218 g of n-butanol and 95 g of 1-amino-3-aminomethylcyclohexane is introduced into a dilution vessel. The precursor containing microgel and NCO groups is introduced over a period of 15–20 minutes, with stirring. This gives a turbid, pasty composition with a bluish tinge, having a solids content of 40%.

EXAMPLES 1 TO 10 OF BASE LACQUERS

In a stirrer vessel, the polyurethane/polyurea elastomer solutions described in Examples A 1 to A 3 are mixed, with stirring, with the polyester solutions described in Examples B 1 to B 4, the melamine/formaldehyde resin described in Example C and, if appropriate, the copolymer dispersion described in Example D and/or the microgel dispersion described in Examples E 1 and E 2, in such a way that a homogeneous mixture is formed, the composition of which, based on 100 parts by weight of the solid, corresponds to the data in Table 1. The quantity indicated in this table of a non-leafing aluminum bronze is then carefully made into a 65% paste in aliphatic hydrocarbons with the 1.5-fold quantity of butyl acetate, based on the solid aluminum bronze, and added, with stirring, to the corresponding mixtures, described above, of polyurethane/polyurea elastomer solution, polyester, melamine/formaldehyde resin solutions and, if appropriate, copolymer dispersion and/or microgel, and dispersed. The resulting mixtures are brought to a solids content of 25% by weight with a mixture of 50 parts by weight of butyl acetate, 25 parts by weight of butylglycol acetate and 25 parts by weight of butanol.

TABLE 1

| Base lacquer (solids content of the solution in parts by weight, based on total solids content = 100) | | | | | | | | | | |
|---|---|---|---|---|---|---|---|---|---|---|
| | 1 | 2 | 3 | 4 | 5 | 6 | 7 | 8 | 9 | 10 |
| A 1 | 30 | — | — | — | — | 21 | — | — | 48 | 25 |
| A 2 | — | 60 | — | 60 | — | — | 40 | — | — | — |
| A 3 | — | — | 45 | — | 40 | — | — | 35 | — | — |
| B 1 | 40 | — | — | — | — | 50 | 21 | — | — | — |
| B 2 | — | 10 | — | 5 | — | — | — | — | — | — |
| B 3 | — | — | 25 | — | 21 | — | — | — | — | 45 |
| B 4 | — | — | — | — | — | — | — | 37 | 38 | — |
| C | 12 | 12 | 12 | 12 | 12 | 17 | 12 | 16 | 15 | 18 |
| D | 6 | 6 | 6 | — | — | — | — | — | — | — |
| E 1 | — | — | — | 10 | — | — | 15 | — | — | — |
| E 2 | — | — | — | — | 15 | — | — | — | — | — |
| Aluminum | 12 | 12 | 12 | 12 | 12 | 12 | 12 | 12 | 12 | 12 |

EXAMPLE K 1, CLEAR LACQUER BASED ON ACRYLATE 941 g of a mixture of aromatics with a boiling range of 156°–170° C. are weighed out into a 3 liter reaction vessel fitted with a thermometer, a stirrer, an electrical resistance heater, a reflux condenser and a feed vessel, and are heated to 140° C., with stirring. A mixture of 223 g of styrene, 223 g of methyl methacrylate, 208 g of butane-1,4-diol monoacrylate, 30 g of acrylic acid, 803 g of n-butyl acrylate and 18 g of di-tert.-butyl peroxide is metered uniformly from the feed vessel into the reaction vessel over a period of 3 hours and the temperature is kept at 140° C. The reaction mixture is kept at 140° C. for a further 30 minutes and a solution of 4 g of di-tert.-butyl peroxide in 50 g of a mixture of aromatics with a boiling range of between 156° and 172° C. is then added. After a further 2 hours at 140° C., an acrylate resin solution with a solids content of 60% results. The acrylate resin has an acid number of 14, an OH number of 109 and a viscosity of 250 mPa.s (measured as a 50% solution in xylene with an ICI viscometer).

EXAMPLE K 2, CLEAR LACQUER 300 g of the solution of melamine/formaldehyde resin described in Example C, 150 g of xylene and 50 g of butylglycol acetate are added, with stirring, to 550 g of the 60% acrylate resin solution described in Example K 1, and the whole is carefully mixed. This results in a clear lacquer with a solids content of 46.5%.

Preparation of the Coatings

To prepare the coatings, sections of body sheet used in motorcar production enameling, which have been passivated by an iron phosphate treatment and have received a coat by means of cathodic electrophoretic enameling and a stoving filler, are coated with the base lacquers described in Examples 1 to 10 and the clear lacquer described in Example K 2.

For this purpose, the base lacquers described in Examples 1 to 10 are adjusted with a solvent mixture of xylene and butyl acetate (70:30) to a viscosity of 16 seconds according to DIN 53 211, and the clear lacquer described in Example K 2 is adjusted with this solvent mixture to a viscosity of 28 seconds according to DIN 53 211.

The adjusted base lacquers are sprayed onto the described, pretreated body sheet sections with a cup gun having a nozzle width of 1.2 mm and operating under an air spraying pressure of 4 bar, in such a way that the resulting dry film thickness of the base lacquer is 12 to 17 μm. After 5 minutes, the sprayed-on base lacquer is sprayed with the adjusted clear lacquer, under the said spraying conditions, in such a way that the resulting dry film thickness of the clear lacquer is 35 to 40 μm. After exposure to the air for 15 minutes at room temperature, the sheet sections are stoved in a circulating air oven for 30 minutes at 130° C.

The coatings prepared in this way have an outstanding metallic effect, which can be assessed by those skilled in the art, and meet the requirements of the tests listed in the technical terms of delivery of motorcar production enamel.

What is claimed is:

1. A coating composition for the preparation of the base coat of a multilayer enamel consisting of at least one base and one transparent protective coat, the said coating composition containing binders based on organic resins, metallic pigments, organic solvents and, if appropriate, other pigments as well as customary additives and auxiliaries, wherein the binders consist of the following components:
   A. 20 to 60% by weight of one or more polyurethane and/or urea elastomers prepared from
      ($a_1$) linear compounds with terminal hydroxyl and/or primary and/or secondary amino groups and
      ($a_2$) aliphatic and/or cycloaliphatic diisocyanates, the molar ratio of $a_1$ to $a_2$ being 0.8:1 to 1.5:1,
   B. 10 to 50% by weight of one or more polyesters prepared from
      ($b_1$) aromatic and aliphatic and/or cycloaliphatic polycarboxylic acids, 40 to 70 mol % of the polycarboxylic acids being aromatic and 60 to 30 mol % of the polycarboxylic acids being aliphatic and/or cycloaliphatic, and 0 to 50 mol % of the total polycarboxylic acids being tricarboxylic acids, and
      ($b_2$) polyols,
         20 to 60 mol % of the polyols having 2 or 3 carbon atoms and 40 to 80 mol % having 4 or more carbon atoms,
         at least 40 mol % of the diols used having aliphatic side-chains,
         0 to 50 mol % of the polyols being triols and
         the ratio of the components $b_1$ and $b_2$ corresponding to the following formula $$K = \frac{n_1 - n_2 (F - 2)}{n_2}$$

in which $n_1$ denotes the number of mol of polyols, $n_2$ denotes the number of mol of polycarboxylic acids, F denotes the average molar value of the functionality of the polycarboxylic acids and K has a value of 1.05 to 1.5, and
   C. 5 to 25% by weight of polycondensates partially etherified with monoalcohols and consisting of melamine, benzoguanamine and/or urea with formaldehyde, the molar ratio of melamine to formaldehyde in the case of melamine/formaldehyde resins being 1:4.5 to 1:6 and the molar ratio of benzoguanamine or urea to formaldehyde in the case of benzoguanamine/formaldehyde or urea/formaldehyde resins being 1:2.5 to 1:4, and the sum of the components A, B and C being 100%.

2. The coating composition as claimed in claim 1, which additionally contains, as component (D), a copolymer prepared from 85 to 95% by weight of ethylene and 15 to 5% by weight of vinyl acetate, in a proportion of 5 to 15% by weight, based on the sum of components (A) to (D).

3. The coating composition as claimed in claim 1 wherein polyester diols and diamines in a molar ratio of 0.8:1 to 1.2:1 have been used as component ($a_1$) to prepare the resin (A).

4. The coating composition as claimed in claim 1 or 3 which, in addition to components (A), (B) and (C), contains, as component (E), polymeric microparticles having a size or size distribution in the range from 0.01 to 2 μm, in a proportion of 5 to 15% by weight, based on the sum of components (A), (B), (C) and (E), the said microparticles having been prepared by emulsion polymerization of a mixture of unsaturated monomers, some of which preferably contain carboxyl or hydroxyl groups and some of which are free of carboxyl and hydroxyl groups, and a polyfunctional crosslinking agent, the emulsion polymerization having been carried out in the aqueous phase and the water having been removed during or after the polymerization.

5. The coating composition as claimed in claim 2, wherein polyester diols and diamines in a molar ratio of 0.8:1 to 1.2:1 have been used as component ($a_1$) to prepare the resin (A).

6. The coating composition as claimed in either claim 2 or 5 which, in addition to components (A), (B), (C) and (D), contains, as component (E), polymeric microparticles having a size or size distribution in the range from 0.01 to 2 μm, in a proportion of 5 to 15% by weight, based on the sum of components (A) to (E), the said microparticles having been prepared by emulsion polymerization of a mixture of unsaturated monomers, some of which preferably contain carboxyl or hydroxyl groups and some of which are free of carboxyl and hydroxyl groups, and a polyfunctional crosslinking agent, the emulsion polymerization having been carried out in the aqueous phase and the water having been removed during or after the polymerization.

7. A process for the preparation of coatings, in which a coating composition containing metallic pigments for the formation of a base coat is applied to a substrate, this being followed, after a period of exposure to the air, by the application according to the wet-in-wet process of a second coating composition forming a transparent protective coat, wherein the binders of the coating composition for the base coat consist of the following components:

A. 20 to 60% by weight of one or more polyurethane and/or urea elastomers prepared from
      ($a_1$) linear compounds with terminal hydroxyl and/or primary and/or secondary amino groups and
      ($a_2$) aliphatic and/or cycloaliphatic diisocyanates, the molar ratio of $a_1$ to $a_2$ being 0.8:1 to 1.5:1,
   B. 10 to 50% by weight of one or more polyesters prepared from
      ($b_1$) aromatic and aliphatic and/or cycloaliphatic polycarboxylic acids, 40 to 70 mol % of the polycarboxylic acids being aromatic and 60 to 30 mol % of the polycarboxylic acids being aliphatic and/or cycloaliphatic, and 0 to 50 mol % of the total polycarboxylic acids being tricarboxylic acids, and
      ($b_2$) polyols,
         20 to 60 mol % of the polyols having 2 or 3 carbon atoms and 40 to 80 mol % having 4 or more carbon atoms,
         at least 40 mol % of the diols used having aliphatic side-chains,
         0 to 50 mol % of the polyols being triols and the ratio of the components $b_1$ and $b_2$ corresponding to the following formula $$K = \frac{n_1 - n_2(F - 2)}{n_2}$$

in which $n_1$ denotes the number of mol of polyols, $n_2$ denotes the number of mol of polycarboxylic acids, F denotes the average molar value of the functionality of the polycarboxylic acids and K has a value of 1.05 to 1.5, and
   C. 5 to 25% by weight of polycondensates partially etherified with monoalcohols and consisting of melamine, benzoguanamine and/or urea with formaldehyde, the molar ratio of melamine to formaldehyde in the case of melamine/formaldehyde resins being 1:4.5 to 1:6 and the molar ratio of benzoguanamine or urea to formaldehyde in the case of benzoguanamine/formaldehyde or urea/formaldehyde resins being 1:2.5 to 1:4, and the sum of the components A, B and C being 100%.

8. The process as claimed in claim 7, wherein the coating composition for the base coat contains, as a further binder component (D), a copolymer prepared from 85 to 95% by weight of ethylene and 15 to 5% by weight of vinyl acetate, in a proportion of 5 to 15% by weight, based on the sum of components (A) to (D).

9. The process as claimed in claim 7 wherein polyester diols and diamines in a molar ratio of 0.8:1 to 1.2:1 have been used as component ($a_1$) to prepare the resin (A).

10. The process as claimed in claim 7 or 9 wherein, in addition to components (A), (B) and (C), the coating composition contains, as component (E), polymeric microparticles having a size or size distribution in the range from 0.01 to 2 μm, in a proportion of 5 to 15% by weight, based on the sum of components (A), (B), (C) and (E), the said microparticles having been prepared by emulsion polymerization of a mixture of unsaturated monomers, some of which preferably contain carboxyl or hydroxyl groups and some of which are free of carboxyl and hydroxyl groups, and a polyfunctional crosslinking agent, the emulsion polymerization having been carried out in the aqueous phase and the water having been removed during or after the polymerization.

11. The process as claimed in claim 8 wherein, in addition to components (A), (B),(C) and (D), the coating composition contains, as component (E), polymeric microparticles having a size or size distribution in the range from 0.01 to 2 μm, in a proportion of 5 to 15% by weight, based on the sum of components (A) to (E), the said microparticles having been prepared by emulsion polymerization of a mixture of unsaturated monomers, some of which preferably contain carboxyl or hydroxyl groups and some of which are free of carboxyl and hydroxyl groups, and a polyfunctional crosslinking agent, the emulsion polymerization having been carried out in the aqueous phase and the water having been removed during or after the polymerization.

12. A substrate coated with a multilayer enamel consisting of at least one coat containing metallic pigments and at least one transparent protective coat, wherein a coating composition as claimed in one of claims 1, 2, 3 or 5 has been used to prepare the base coat.

13. A substrate coated with a multilayer enamel consisting of at least one coat containing metallic pigments and at least one transparent protective coat, wherein a coating composition as claimed in claim 4 has been used to prepare the base coat.

14. A substrate coated with a multilayer enamel consisting of at least one coat containing metallic pigments and at least one transparent protective coat, wherein a coating composition as claimed in claim 6 has been used to prepare the base coat.

* * * * *